United States Patent [19]
Campbell et al.

[11] 4,436,075
[45] Mar. 13, 1984

[54] FUEL PRE-HEAT DEVICE

[75] Inventors: Robert L. Campbell, Decatur, Ill.; Daniel D. Bailey, 1014 Norman, Anchorage, Ak. 99504

[73] Assignee: Daniel D. Bailey, Anchorage, Ak.

[21] Appl. No.: 337,850

[22] Filed: Jan. 7, 1982

[51] Int. Cl.³ .............................................. F02M 31/00
[52] U.S. Cl. ........................................ 123/557; 165/51
[58] Field of Search ...................... 123/557; 165/51, 52

[56] References Cited

U.S. PATENT DOCUMENTS

| | | | |
|---|---|---|---|
| 1,168,111 | 1/1916 | Pope | 123/557 |
| 4,015,567 | 4/1977 | Zabenskie | 123/557 |
| 4,091,782 | 5/1978 | Dunnam | 123/557 |
| 4,218,999 | 8/1980 | Shearer | 123/557 |
| 4,294,219 | 10/1981 | Rowe | 123/557 |
| 4,323,043 | 4/1982 | Alderson | 123/557 |

FOREIGN PATENT DOCUMENTS

| | | | |
|---|---|---|---|
| 618822 | 4/1961 | Canada | 123/557 |
| 960534 | 1/1975 | Canada | 123/557 |
| 807147 | 6/1951 | Fed. Rep. of Germany | 123/557 |
| 338750 | 3/1936 | Italy | 123/557 |
| 560320 | 11/1972 | Switzerland | 123/557 |

*Primary Examiner*—Ronald H. Lazarus
*Attorney, Agent, or Firm*—Cohn, Powell & Hind

[57] ABSTRACT

This fuel pre-heat device includes a tubular section, which is connected at each end to a radiator hose to receive heat from the hose, and a fuel line section which is wrapped around the holder. A housing is provided to enclose the wrapped fuel line, and a pressure regulator is connected to the fuel line to regulate the pressure of fuel entering the engine.

5 Claims, 4 Drawing Figures

10 62 50 60 64 16 64 40 16 42 66 66 42 54 56 56 52 48 44 46

14
18
16
10
26
30
24
20
22
12

66
52
62
40
44
30
56
58
54

16
42
52
56
46
40
66
64
60
44
50
62
10
48
54

68
40
44
70
60
64
66
10

FUEL PRE-HEAT DEVICE

BACKGROUND OF THE INVENTION

This invention relates generally to fuel pre-heat devices and particularly to a pre-heat device by which fuel is heated before being supplied to an engine.

It is well known that supplying heated fuel to a gasoline or diesel engine results in more efficient utilization of the fuel by providing a more combustible mixture. Several patents disclose heat transfer devices which are intended to produce this advantage.

U.S. Pat. No. 1,925,032 for example discloses a container which is secured to an automobile exhaust pipe and provided with means for spacing the container from the pipe to adjust the heat transfer. The container includes perforated baffles through which the fuel is passed but only a small area of the container is in contact with the exhaust pipe and thus heat transfer is limited. U.S. Pat. No. 1,202,610 discloses a coil disposed about an exhaust pipe to heat water for later mixing with gasoline. Another patent, German Pat. No. 807,147 disloses the use of a fuel line loop inserted within a radiator hose to preheat the fuel which requires special sealing for the fuel line.

The present invention provides a pre-heat device having advantages not found in the above or other examples of the known prior art.

SUMMARY OF THE INVENTION

This fuel pre-heat device provides a simple and direct heat transfer means for heating fuel prior to introduction of the fuel into an internal combustion engine in order to improve the combustion efficiency and reduce harmful emissions.

The pre-heat device includes a tubular section having opposed open ends communicating with the radiator hose of a water cooled engine; a fuel line section including opposed end portions and an intermediate coiled portion wrapped around the holder, one of said end portions being connected to a fuel pump and the other of said end portions being connected to a fuel dispenser; and a housing for the coiled portion of the fuel line, said housing having a tubular body and opposed covers, each of said covers having an opening adapted to receive one end of the tubular section and an opening adapted to receive one end of the fuel line section.

It is an aspect of this invention to provide a pressure regulator between the fuel line section and the fuel dispenser.

It is another aspect of this invention to provide the fuel line section coiled portion with at least two turns, the opposed ends being disposed in cross-over relation to each other.

It is yet another aspect of this invention to provide circular housing covers having offset openings for the tubular section and the fuel line section.

It is still another aspect of this invention to provide that the housing body is spaced from the fuel line section coiled portion and the end portions of said section.

It is another aspect of this invention to provide the housing body with annular end recesses and to provide covers which are adhesively attached within said end recesses.

DESCRIPTION OF THE PREFERRED EMBODIMENT

Figure 1:
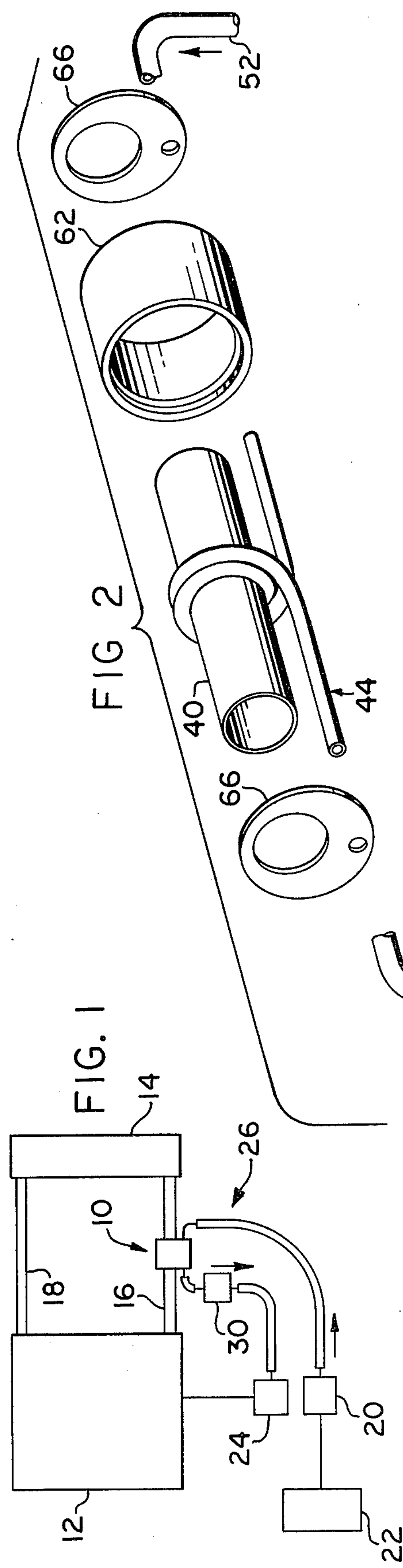
FIG. 1 is a schematic view showing the fuel pre-heat device used in conjunction with an automobile engine.

Referring now by reference numerals to the drawing and first to FIG. 1 it will be understood that the fuel pre-heat device generally indicated by numeral 10 is used in conjunction with an automobile engine system which includes an engine 12; a radiator 14 connected to the engine 12 by water hoses 16 and 18; a fuel pump 20 supplied by a fuel tank 22 and a carburetor 24 which provides a fuel dispenser.

The pre-heat device 10 is inserted into the radiator hose and includes a flexible fuel line generally indicated by numeral 26, and a pressure regulator 30. The fuel line is connected between the fuel pump 20 and the carburetor 24 as by clamps (not shown). A conventional diaphragm type regulator is used to control the change in pressure of the fuel heated by the pre-heat device 10.

Figure 2:
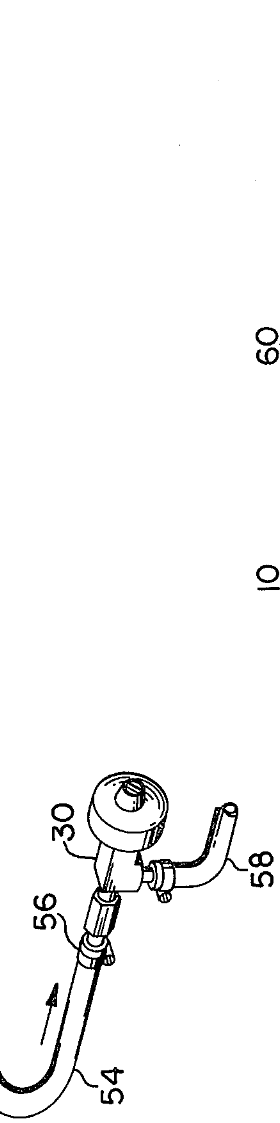
FIG. 2 is an exploded perspective view of the component parts of the device.
Figure 3:
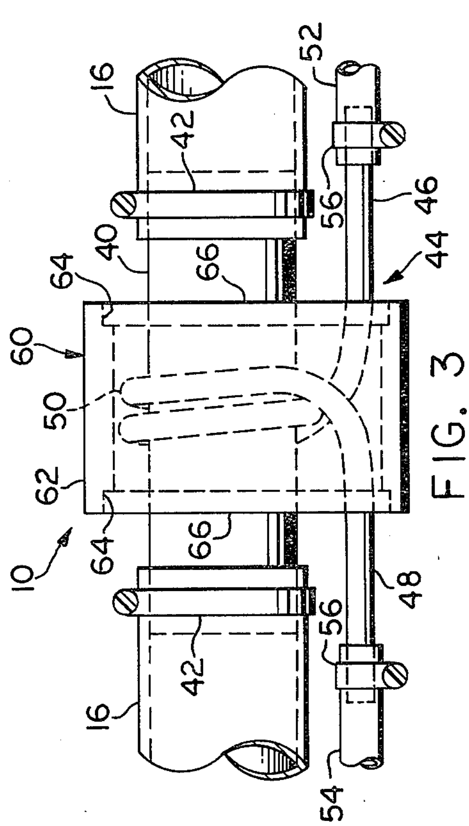
FIG. 3 is an elevational view of the device.
Figure 4:
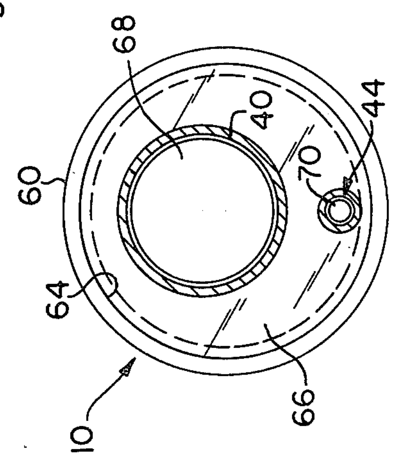
FIG. 4 is an end view of the device.

The details of the pre-heat device 10 are best understood by reference to FIGS. 2 through 4. As shown, the device includes a tubular section 40 of copper, or the like, open at the ends to receive the radiator hose 16 to which it is connected as by clamps 42, and a fuel line section 44, preferably of copper or the like. The fuel line section 44 includes opposed end portions 46 and 48 and an intermediate coiled portion 50 wrapped around the tubular section 40. In the preferred embodiment, the coiled portion 50 includes two coil turns and the end portions 46 and 48 are disposed in cross-over relation to each other as clearly shown in FIG. 3. The end portions 46 and 48 are connected to the fuel pump 20 and the pressure regulator 30 by flexible fuel line sections 52 and 54, respectively, clamped between said components as by clamps 56. Similarly, the pressure regulator 30 is connected to the carburetor 24 by fuel line section 58.

The pre-heat device 10 also includes a housing 60 of plastic such as polyvinylchloride, or the like, which consists essentially of a body portion 62 having annular recesses 64 at each end to receive opposed covers 66 which are attached therein as by adhesive. As best shown in FIGS. 2 and 4, the covers 66 include offset openings 68 and 70 which receive respectively the tubular section 40 and the fuel line end portions 46 and 48 therethrough. The body portion 62 is spaced from the intermediate and end portions of the fuel line section 44 of the preferred embodiment.

It is thought that the structural features and functional advantages of this fuel pre-heat device has become fully apparent from the foregoing description of parts but for completeness of disclosure the installation of the device will be briefly described.

Essentially, the fuel pre-heat device 10 is inserted between the fuel pump 20 and the carburetor 24 in lieu of the normal connection between these components. In order to install the device 10, which is preassembled with the fuel line section 44 disposed about the tubular section 40 and the housing 60 in place, the radiator hose 16 is cut to remove a section of about two inches (2″) in length and the hose ends are clamped to the ends of the tubular section 40.

After installation of the device 10 within the hose 16, the normal copper fuel line between the fuel pump 20 and the carburetor 24 is cut and the flexible fuel line 52 clamped between the end 46 of the fuel line section 44 and the severed end of the line from the fuel pump 20. Following this, flexible fuel line 54 is clamped between the end 48 of the fuel line section 44 and the pressure regulator 30. Finally, the circuit is completed by clamping flexible fuel line section 58 between the pressure regulator 30 and the severed end of the line from the carburetor 24.

At this stage, the fuel pre-heat device 10 is ready for use. The pressure regulator 30 provides a means of adjusting the pressure of the fuel and, in the preferred embodiment, is a diaphragm type regulator having a screw adjustment. This regulator provides a means of adjusting the pressure of the fuel, which has been increased due to heat transfer by virtue of the pre-heat device, until optimum conditions are realized.

In the embodiment shown the pressure regulator 30 is pre-set to two-and-one-half pounds per square inch ($2\frac{1}{2}$ p.s.i.). If there is fuel flooding, the regulator is adjusted to decrease the fuel flow. If there is fuel starvation, the regulator is adjusted until this condition is rectified.

In regions where seasonal average high temperatures are in excess of ninety degrees (90° F.) it may be advantageous to disconnect the regulator during the high temperature season.

I claim as my invention:

1. A fuel pre-heat device for use with an engine having a fuel pump, a fuel dispenser and a radiator hose, the device comprising:

(a) a tubular section having opposed ends communicating with the radiator hose, (b) a fuel line section including opposed end portions and an intermediate coiled portion wrapped around the tubular section, one of said end portions being connected to the fuel pump and the other of said end portions being operatively connected to the fuel dispenser, (c) a housing for the coiled portion of the fuel line including a tubular body having annular end recesses and opposed covers attached within the end recesses, each of said covers having an opening adapted to receive one end of the tubular section and an opening adapted to receive one end portion of the fuel line section, and (d) the fuel line section coiled portion including at least two turns and the ends being disposed in cross-over relation to each other.

2. A fuel pre-heat device as defined in claim 1, in which:

(e) the housing covers are circular discs and the opening for the tubular section and the fuel line section are offset from the center thereof.

3. A fuel pre-heat device as defined in claim 2, in which:

(f) the housing body is spaced from the fuel line section coiled portion and the end portions of said section.

4. A fuel pre-heat device as defined in claim 1 in which:

(e) the covers are adhesively attached within the end recesses.

5. A fuel pre-heat device as defined in claim 1 in which:

(e) a pressure regulator is connected between the fuel line section and the fuel dispenser.

* * * * *